US011748297B2

United States Patent
Abdolee et al.

(10) Patent No.: US 11,748,297 B2
(45) Date of Patent: Sep. 5, 2023

(54) RECONFIGURABLE SECURITY HARDWARE AND METHODS FOR INTERNET OF THINGS (IOT) SYSTEMS

(71) Applicants: Reza Abdolee, Camarillo, CA (US); Vida Vakilian, Camarillo, CA (US)

(72) Inventors: Reza Abdolee, Camarillo, CA (US); Vida Vakilian, Camarillo, CA (US)

(73) Assignee: CSUB Auxiliary for Sponsored Programs Administration, Bakersfield, CA (US)

( * ) Notice: Subject to any disclaimer, the term of this patent is extended or adjusted under 35 U.S.C. 154(b) by 478 days.

(21) Appl. No.: 16/859,478

(22) Filed: Apr. 27, 2020

(65) Prior Publication Data

US 2020/0344040 A1    Oct. 29, 2020

Related U.S. Application Data

(60) Provisional application No. 62/839,393, filed on Apr. 26, 2019.

(51) Int. Cl.
*G06F 1/24* (2006.01)
*G06F 9/00* (2006.01)
(Continued)

(52) U.S. Cl.
CPC .......... *G06F 15/7871* (2013.01); *G16Y 30/10* (2020.01); *G16Y 40/35* (2020.01);
(Continued)

(58) Field of Classification Search
CPC .... G06F 15/7871; G16Y 30/10; G16Y 40/35; H04L 9/0618; H04L 9/0668;
(Continued)

(56) References Cited

U.S. PATENT DOCUMENTS 6,351,539 B1    2/2002    Djakovic
8,127,130 B2    2/2012    Ellis
(Continued)

FOREIGN PATENT DOCUMENTS

GB        2345229 A        6/2000

OTHER PUBLICATIONS

International Search Report and Written Opinion; International Searching Authority/US dated Jul. 21, 2020; International Application No. PCT/US2020/030117; 6 pgs.; ISA/US Commissioner for Patents, Alexandria, VA.
(Continued)

*Primary Examiner* — Xuxing Chen
(74) *Attorney, Agent, or Firm* — Andrew D. Fortney; Central California IP Group, P.C.

(57) ABSTRACT

A hardware encryption module with reconfigurable security algorithms for randomly selecting block ciphers, stream ciphers, and their components, for internet of things (IoT) and data security applications. A corresponding system contains a hardware number generator for generating unique secrets in digital and wireless communication protocols. The system contains a cryptographically secure pseudorandom number generator for creating deterministic random sequences for the reconfigurable logic module. The system contains a multiplexing scheme to send keys and cipher texts in accordance with a wireless communication protocol. The hardware encryption module can be used to reconfigure block cipher algorithms, modes of operation, key scheduling algorithms, confusion functions, and/or round orders, based on reconfigurable logic. One type of reconfigurable logic allows stream cipher algorithms and key mixing keys to be changed at random.

20 Claims, 9 Drawing Sheets

(51) Int. Cl.
*G06F 15/78* (2006.01)
*H04L 9/06* (2006.01)
*H04L 9/08* (2006.01)
*G16Y 40/35* (2020.01)
*G16Y 30/10* (2020.01)

(52) U.S. Cl.
CPC .......... *H04L 9/0618* (2013.01); *H04L 9/0668* (2013.01); *H04L 9/0841* (2013.01); *H04L 9/0869* (2013.01); *H04L 9/0877* (2013.01); H04L 2209/24 (2013.01); H04L 2209/80 (2013.01)

(58) Field of Classification Search
CPC ... H04L 9/0841; H04L 9/0869; H04L 9/0877; H04L 2209/24; H04L 2209/80; H04L 9/003; H04L 9/0662
See application file for complete search history.

(56) References Cited

U.S. PATENT DOCUMENTS

| | | | |
|---|---|---|---|
| 9,710,623 | B2 | 7/2017 | Michiels et al. |
| 9,800,409 | B2* | 10/2017 | Nemiroff ................ G06F 7/582 |
| 9,934,400 | B2 | 4/2018 | Gilbert |
| 9,954,681 | B2* | 4/2018 | Case ...................... H04L 9/0894 |
| 2003/0159053 | A1* | 8/2003 | Fauble ...................... G06F 21/83 713/189 |
| 2004/0193898 | A1 | 9/2004 | Ochi et al. |
| 2005/0223226 | A1* | 10/2005 | Sundararajan ........ H04L 63/061 713/168 |
| 2006/0245590 | A1 | 11/2006 | Brickell |
| 2009/0323944 | A1* | 12/2009 | Vanstone .............. H04L 9/0869 380/46 |
| 2010/0211787 | A1 | 8/2010 | Bukshpun et al. |
| 2011/0087883 | A1* | 4/2011 | Campagna ............ H04L 9/0861 380/44 |
| 2011/0154056 | A1* | 6/2011 | Spalka ................. G06F 21/6245 380/46 |
| 2011/0307698 | A1* | 12/2011 | Vanstone .............. H04L 9/0869 713/171 |
| 2013/0010955 | A1 | 1/2013 | Lu et al. |
| 2013/0061039 | A1 | 3/2013 | Ellis |
| 2013/0201316 | A1* | 8/2013 | Binder .................... H04L 67/12 701/2 |
| 2014/0016776 | A1 | 1/2014 | Van Foreest et al. |
| 2017/0193859 | A1 | 7/2017 | Klippstein et al. |
| 2017/0365191 | A1 | 12/2017 | Malka |
| 2018/0198613 | A1* | 7/2018 | Anderson ............. G06F 21/602 |
| 2019/0347399 | A1* | 11/2019 | Cramer .................. G06F 21/46 |
| 2019/0349342 | A1* | 11/2019 | D'Ercoli ............... H04W 12/63 |
| 2020/0074464 | A1* | 3/2020 | Trevethan ............. H04L 9/3236 |
| 2020/0344050 | A1* | 10/2020 | Anshel .................. H04L 9/0838 |
| 2021/0281408 | A1* | 9/2021 | Liu ........................ H04W 12/04 |
| 2021/0328792 | A1* | 10/2021 | Ramesh ................ H04L 9/3033 |
| 2022/0141002 | A1* | 5/2022 | Tate ...................... H04L 9/3268 713/171 |

OTHER PUBLICATIONS

M.T. Ramirez-Torres et al.; "FPGA Implementation of a Reconfigurable Image Encryption System"; Dec. 2014; 5 pgs.; 2014 International Conference on ReConFigurable Computing and FPGAs; IEEE.

International Preliminary Report on Patentability dated Nov. 4, 2021; International Application No. PCT/US2020/330117; International filing date Apr. 27, 2020; 5 pages; The International Bureau of WIPO, Geneva, Switzerland.

Mohammad Maroufi et al.; "On the Convergence of Blockchain and Internet of Things (IOT) Technologies"; Mar. 11, 2019; 11 pgs.

Reza Abdolee, Ph.D.; "Cybersecurity in Industrial IoT Systems"; believed to have been published in Oct. 2019; 23 pgs ; California State University, Channel Islands (CSUCI).

* cited by examiner

RECONFIGURABLE SECURITY HARDWARE AND METHODS FOR INTERNET OF THINGS (IOT) SYSTEMS

RELATED APPLICATION(S)

This application claims priority to U.S. Provisional Pat. Appl. No. 62/839,393, filed Apr. 26, 2019, incorporated herein by reference.

FIELD OF THE INVENTION

The field of the invention pertains to data communication systems including, but not limited to, systems that include or relate to Internet of Things (IoT), lightweight and ultra lightweight cryptography, and secure public key transfer.

The present invention relates to securing data communications using cryptography, and in particular to the hardware reconfigurability of encryption algorithms for IoT.

Furthermore, the invention relates to methods of cryptography that use block ciphers, stream ciphers, and reconfigurable hardware which have applications in resource-constrained devices such as those pertaining to IoT.

DISCUSSION OF THE BACKGROUND

The Internet of Things (IoT) is a progressing technology that has the ability to turn physical and/or electronic objects (e.g., water meters, refrigerators, lights, smoke alarms, pet trackers, temperature sensors, humidity sensors, etc.) into autonomously connected devices. IoT technology increases the quality of life and minimizes society's direct involvement with everyday tasks that can be automated. Realizing certain IoT capabilities depends largely on security risks associated with wireless devices. IoT devices are more susceptible to attacks due to the nature of their designed functionality. Typically, they are low-cost, low-power, and resource-constrained devices with sensors and radio transceivers for communication. The ultimate job of an IoT device is to collect data (measuring parameters of an underlying physical phenomenon), perform minimal signal processing, transmit/receive data, and to control processes according to the command received from the system controller. Due to limited resources, the amount of storage and processing dedicated to encryption is much smaller than that of a typical computer network. When compared to a computer network, IoT systems are more vulnerable to attacks. These weaknesses have prompted researchers to improve security prior to the large-scale deployment of these devices.

Stronger lightweight cryptography is one of the solutions aimed at improving security in IoT systems. Lightweight and ultra lightweight cryptography aims to provide robust encryption for resource-constrained devices. There are already many different lightweight stream ciphers and block ciphers designed to optimize computation, energy consumption, and throughput while maintaining the highest level of security. However, there is still an ongoing search for cryptography algorithms that provide enhanced security with minimal strain on the computation environment. There is a need for additional security without additional computational load or overhead that require higher execution times, higher memory consumption, and lower throughput.

There is also a need for a method of using reconfigurable algorithms whereby the block ciphers, stream ciphers, and their components can be changed at random. For block ciphers, this amounts to having the ability to vary the encryption algorithms modes of operation, key schedules, confusion functions, and order of encryption rounds. For stream ciphers, this amounts to varying the encryption algorithm and the key mixing schemes. This is made possible with the use of a hardware random number generator (HRNG), cryptographically secure pseudo random number generator (CSPRNG), field programmable gate array (FPGA), partial dynamic reconfigurable hardware, and application specific integrated circuit (ASIC).

UK Patent No. 2345229B discloses a cryptographic method that changes the round order in a cipher block using a random number generator to prevent differential power analysis. This method is limited to embodiments that describe round order change.

U.S. Pat. No. 6,351,539 discloses a method for using multiple cipher blocks and a multiplexer to transmit encrypted data. However, this method does not include in its design a component to randomly select cipher block algorithms through reconfigurable hardware.

U.S. Pat. No. 8,127,130 discloses a method for changing the encryption and decryption algorithm referred to as reconfigurable logic. This patent is limited to embodiments that describe algorithm reconfiguration.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

Objects of the Invention

Therefore, it is a primary object, feature, or advantage of the present invention to minimize practical and theoretical attacks as described in the field of cryptanalysis. For example, one purpose of the invention is to enhance and/or simplify encryption in all IoT and data security applications and to improve security in IoT devices. Another purpose of the present invention is to facilitate the design of a hardware encryption module with reconfigurable security algorithms or circuits for randomly selecting block ciphers, stream ciphers, and their components.

It is an objective, feature, or advantage of the present invention to provide a method for symmetric encryption/decryption, which improves the security of lightweight block ciphers while maximizing throughput.

It is an objective, feature, or advantage of the present invention to provide a method for symmetric encryption/decryption, which improves the security of lightweight stream ciphers while maximizing throughput.

Another object, feature, or advantage of the present invention is to provide a method of encryption that takes advantage of reconfigurable hardware to select the encryption algorithms in real-time while sending/receiving data.

Another object, feature, or advantage of the present invention is to provide a method that takes advantage of reconfigurable hardware to select a block cipher mode of operation used for encryption.

A further object, feature, or advantage of the present invention is to use reconfigurable hardware to select block cipher key scheduling algorithms.

It is an object, feature, of advantage of the present invention to use reconfigurable hardware to select confusion functions within a symmetric block cipher.

It is an object, feature, of advantage of the present invention to use reconfigurable hardware to select the diffusion functions within a symmetric block cipher.

Another object, feature, or advantage of the present invention is to use reconfigurable hardware schemes to create randomized round orders within block cipher encryption.

It is an object, feature, of advantage of the present invention to use reconfigurable hardware to select key mixing methods within a stream cipher.

A further object, feature, or advantage of the present invention is to provide robust encryption methods that allow for more security with less computation in resource-constrained devices.

SUMMARY OF THE INVENTION

There is a need for a method of using reconfigurable algorithms and circuits, whereby the block ciphers, stream ciphers, and their components can be changed at random. For block ciphers, this amounts to having the ability to vary the encryption algorithms, modes of operation, key schedules, confusion functions, and order of encryption rounds. For stream ciphers, this amounts to varying the encryption algorithm and the key mixing schemes. This is made possible with the use of a system comprising a hardware random number generator (HRNG), a cryptographically secure pseudo random number generator (CSPRNG), field programmable gate arrays (FPGAs), partial dynamic reconfigurable hardware, and application specific integrated circuits (ASICs).

The present system includes a HRNG for generating unique secrets in digital and wireless communication protocols. The system includes a CSPRNG for creating deterministic random sequences for the reconfigurable logic module, and a multiplexing scheme to send keys and cipher texts in accordance with wireless communication protocols. The hardware encryption module can reconfigure block cipher algorithms, the mode of operation, key scheduling algorithms, confusion functions, and (where applicable) the round order based on reconfigurable logic. Another type of reconfigurable logic allows stream cipher algorithms and key mixing keys to be changed at random.

In order to overcome the limitations of cryptography in, but not limited to, IoT systems, the embodiments of the invention use a hardware random number generator (HRNG) with any secure public key transfer. For example, the public key transfer may include Diffie-Hellman key exchange, Rivest-Shamir-Adleman (RSA) key exchange, and/or any other means of secure public key transfer. Once the key exchange has successfully been completed, a seeded cryptographically secure pseudo random number generator (CSPRNG) determines the reconfigurable hardware to be executed (e.g., in a field programmable gate array [FPGA]) for encryption and decryption. Based on the output of the CSPRNG, the reconfigurable hardware module randomly chooses the encryption algorithm, mode of operation, key schedule, round order, diffusion, and/or confusion function, as applicable. In such embodiments, all reconfigurable hardware modules are implemented with correct inputs and outputs. Once the encryption is complete, the resulting cipher text is sent. Using a time multiplexing scheme, at time $t=0$, the public key is sent, and at time $t=1$, the cipher text is sent.

For other or further embodiments, public key transfer is done in the same manner as described above. Reconfigurability of the encryption algorithms, modes of operation, and round order are enabled. Such embodiments keep intact each specific encryption algorithm, with the exceptions of options to reconfigure round order and operational mode. An identical multiplexing scheme is used as in the prior embodiments.

For even further embodiments, public key transfer is done as described above, and reconfigurability of stream cipher encryption algorithms and key mixing methods is enabled. An identical time multiplexing scheme is used as discussed above.

Thus, in one respect, the present invention relates to a system or apparatus for encrypting data that constitutes or implements hardware reconfigurable security algorithms, comprising a hardware random number generator; a secure public key exchanger; a multiplexer; a cryptographically secure pseudorandom number generator; a hardware encryption module; one or more block cipher encryption algorithms and/or stream cipher encryption algorithms; and a wireless transmitter and receiver. In some embodiments, the hardware random number generator comprises a random number generator that converts a random process into random bits. The random process may comprise a noise signal (e.g., a thermal noise signal) or a random process utilizing a photoelectric effect, beam splitting, or other quantum phenomena.

In some embodiments, the secure public key exchanger implements a secure public key transfer method comprising a Diffie-Hellman key exchange and/or a Rivest-Shamir-Adleman (RSA) key exchange.

In various embodiments, the multiplexer comprises a space division multiplexer, a frequency division multiplexer, a time division multiplexer, a polarization division multiplexer, an orbital angular momentum multiplexer, and/or a code division multiplexer. In other or further embodiments, the wireless transmitter and receiver may be configured to operate in a wireless wide area network (WWAN), a wireless local area network (WLAN), a wireless personal area network (WPAN), a WiFi network, a Bluetooth network, and/or a Zigbee network.

In some embodiments, wherein the cryptographically secure pseudorandom number generator comprises a random number generator that produces a deterministic random output. For example, the random number generator that produces a deterministic random output may comprise a Yarrow algorithm, a ChaCha20 algorithm, a Fortuna algorithm, an ISAAC algorithm, and/or an Evolutionary algorithm.

In some embodiments, the hardware encryption module comprises a digital circuit. The digital circuit may comprise, for example, a field programmable gate array (FPGA) and/or an applied specific integrated circuit (ASIC). In further embodiments, the digital circuit may comprise partial dynamic reconfigurable hardware. The partial dynamic reconfigurable hardware may include one or more partitions configured to reconfigure (i) one or more algorithms for the cryptographically secure pseudorandom number generator, (ii) the one or more block cipher encryption algorithms, (iii) modes of operation, (iv) one or more key scheduling algorithms, (v) round order within the one or more block cipher encryption algorithms, and/or (vi) one or more diffusion or confusion functions within the block cipher algorithms. In other or even further embodiments, the partial dynamic reconfigurable hardware may include one or more partitions configured to reconfigure the stream cipher encryption algorithms and/or one or more key mixing algorithms.

When the system or apparatus comprises one or more block cipher encryption algorithms, the block cipher encryption algorithm(s) may comprise one or more whitening keys, one or more key scheduling algorithms, and/or one or more confusion, diffusion, permutation, substitution and/or round iterations. Alternatively, when the system or apparatus comprises one or more stream cipher encryption algorithms, the stream cipher encryption algorithm(s) may comprise a pseudorandom key stream and/or one or more key mixing algorithms.

The present invention is not limited to IoT hardware (although the main focus is an improvement to IoT encryption). Depending on the type of communication protocol, encryption may occur somewhat differently. The encryption outlined in various embodiments may be executed using software, instead of hardware.

Advantages of the present invention will become readily apparent from the detailed description of various embodiments below.

BRIEF DESCRIPTION OF THE DRAWINGS

The figures are exemplary embodiments of the invention. Structures in the figures are not to scale, for more clarity in depiction. For a more complete understanding of the invention, reference is made to the following description and accompanying drawings, in which.

Figure 1:
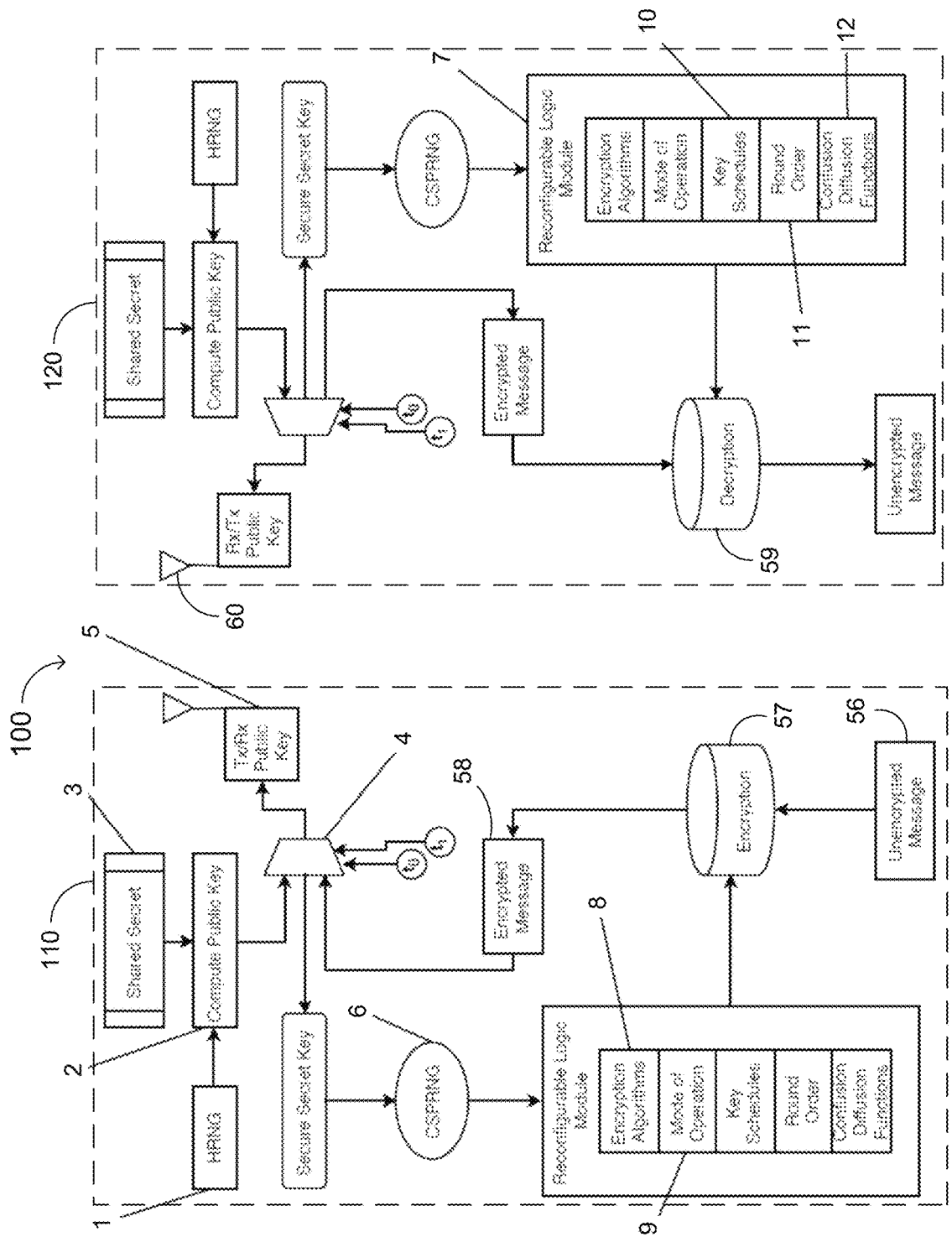
FIG. 1 is an overview of the entire encryption/decryption scheme for block ciphers.

The figures show exemplary embodiments of the invention. For a more complete understanding of the invention, reference is made to the following description and accompanying diagrams.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

The invention may take form as any of three general embodiments, where each general embodiment comprises multiple components and/or methods suitable for one or more reconfigurable hardware algorithms in an IoT application.

A first general embodiment comprises three main modules depicted in FIG. 1, FIG. 2, FIG. 3, FIG. 4, and FIG. 6, which comprise(s) various components. The modules in the reconfigurable logic module 7 constitute or implement a method of encryption/decryption for improving block cipher operation in, but not limited to, IoT systems. FIG. 2, FIG. 3, FIG. 4, and FIG. 6 describe processes that the first general embodiment utilizes. The first general embodiment's system structure is depicted in FIG. 2, FIG. 3, FIG. 4, and FIG. 6.

A second general embodiment comprises three main modules depicted in FIG. 1, FIG. 2, FIG. 3, FIG. 4, and FIG. 6, which comprise(s) various components. The modules in the reconfigurable logic module 7 constitute or implement a method of encryption/decryption for improving block cipher operation in, but not limited to, IoT systems. In the second general embodiment, components 27 and 30 remain fixed. FIG. 2, FIG. 3, FIG. 4, and FIG. 6 describe processes that the second general embodiment utilizes. The second general embodiment's system structure is depicted in FIG. 2, FIG. 3, FIG. 4, and FIG. 6.

A third general embodiment comprises three main modules depicted in FIG. 5, FIG. 2, FIG. 3, FIG. 4, and FIG. 6, which comprise(s) various components. The modules 37 and 38 constitute or implement a method of encryption/decryption for improving stream cipher operation in, but not limited to, IoT systems. The third general embodiment includes processes 1 through 6 (FIG. 1). However, module 7 is changed to accommodate a structure suitable, appropriate or adapted for stream ciphers. FIG. 2, FIG. 3, FIG. 4, and FIG. 6 describe processes that the third general embodiment utilizes. The third general embodiment's system structure is depicted in FIG. 2, FIG. 3, FIG. 4, and FIG. 6.

FIG. 1 shows an exemplary system 100 configured to implement the present invention. The system 100 includes an encryption subsystem 110 and a decryption subsystem 120. The components of the encryption subsystem 110 and the decryption subsystem 120 are essentially the same, but some components may operate in a reverse manner. For example, the encryption subsystem 110 encrypts an unencrypted message 56 using an encryption module 57 and transmits the encrypted message 58 using its antenna (corresponding to antenna 60 in the decryption subsystem 120), whereas the decryption subsystem 120 receives the encrypted message 58 using its antenna 60 and decrypts the encrypted message 58 using a decryption module 59 to obtain the unencrypted message 56. Otherwise, the encryption subsystem 110 and the decryption subsystem 120 generate, transmit and receive the public key and the secure secret key in substantially the same conventional manner. In addition, the reconfigurable logic module 7 (which is shown in greater detail in FIG. 3 and discussed in greater detail below) is substantially the same in each of the encryption subsystem 110 and the decryption subsystem 120.

The invention may use and/or implement one or more of the following Equations:

$$A = g^a \bmod p \tag{1}$$

$$B = g^b \bmod p \tag{2}$$

$$S = B^a \bmod p \tag{3}$$

$$S = A^b \bmod p \tag{4}$$

Figure 2:
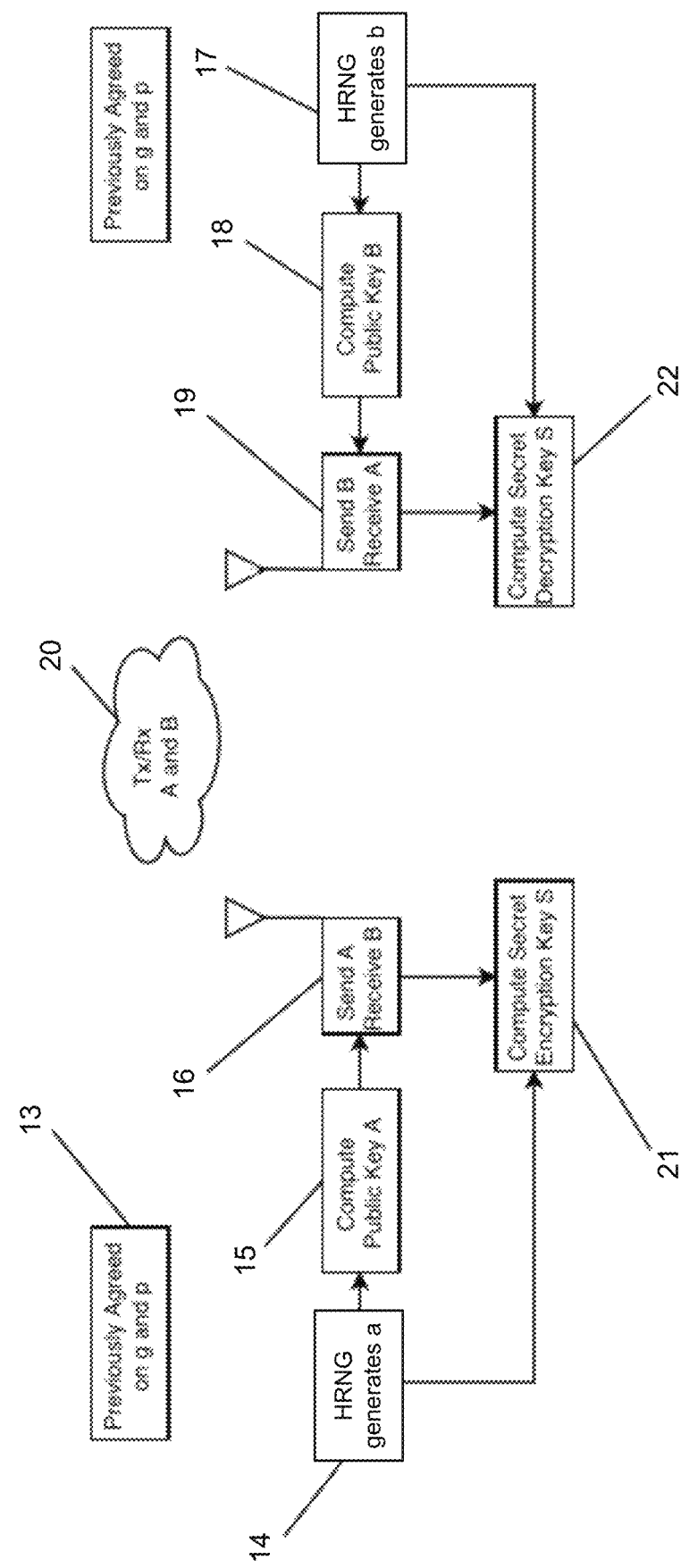
FIG. 2 is a diagram showing a public key exchange using a hardware random number generator.

For the first, second and third general embodiments, the Diffie-Hellman public key exchange shown in FIG. 2 is used as an example of secure key transfer. However, the general embodiments are not limited to only this example. Method step 13 (FIG. 2) includes two previously agreed upon numbers, g and p, where p is prime and g is a primitive root modulo p. A hardware number generator 14 produces a truly random value a on the transmission end. A computation 15 defines the public key as determined by Equation (1) above on the transmission side. A wireless transmission device 16 sends the public key A and receives public key B. A hardware number generator 17 produces a truly random value b on the receiving end. A computation 18 defines the public key as determined by Equation (2) above on the transmission side. A physical device (e.g., a transmitter) 19 transmits the public key B and receives the public key A. A wireless communication medium 20 communicates the public key and cipher message. A computation 21 computes the secret encryption key as determined by Equation (3) above. A computation 22 computes the secret encryption key as determined by Equation (4) above.

Decryption is performed in the opposite sequence and/or manner of encryption. This public key exchange method is given as an example. A deterministic Cryptographically Secure Pseudo Random Number generator may ensure that both sides of communication (e.g., encryption and decryption) know the order in which certain encryption blocks and keys are used. On the decryption side, depending on which blocks are used and where they are used, the system injects the correct keys in the correct order. However, each of the first, second and third general embodiments may use any type of secure key transfer protocol.

Figure 3:
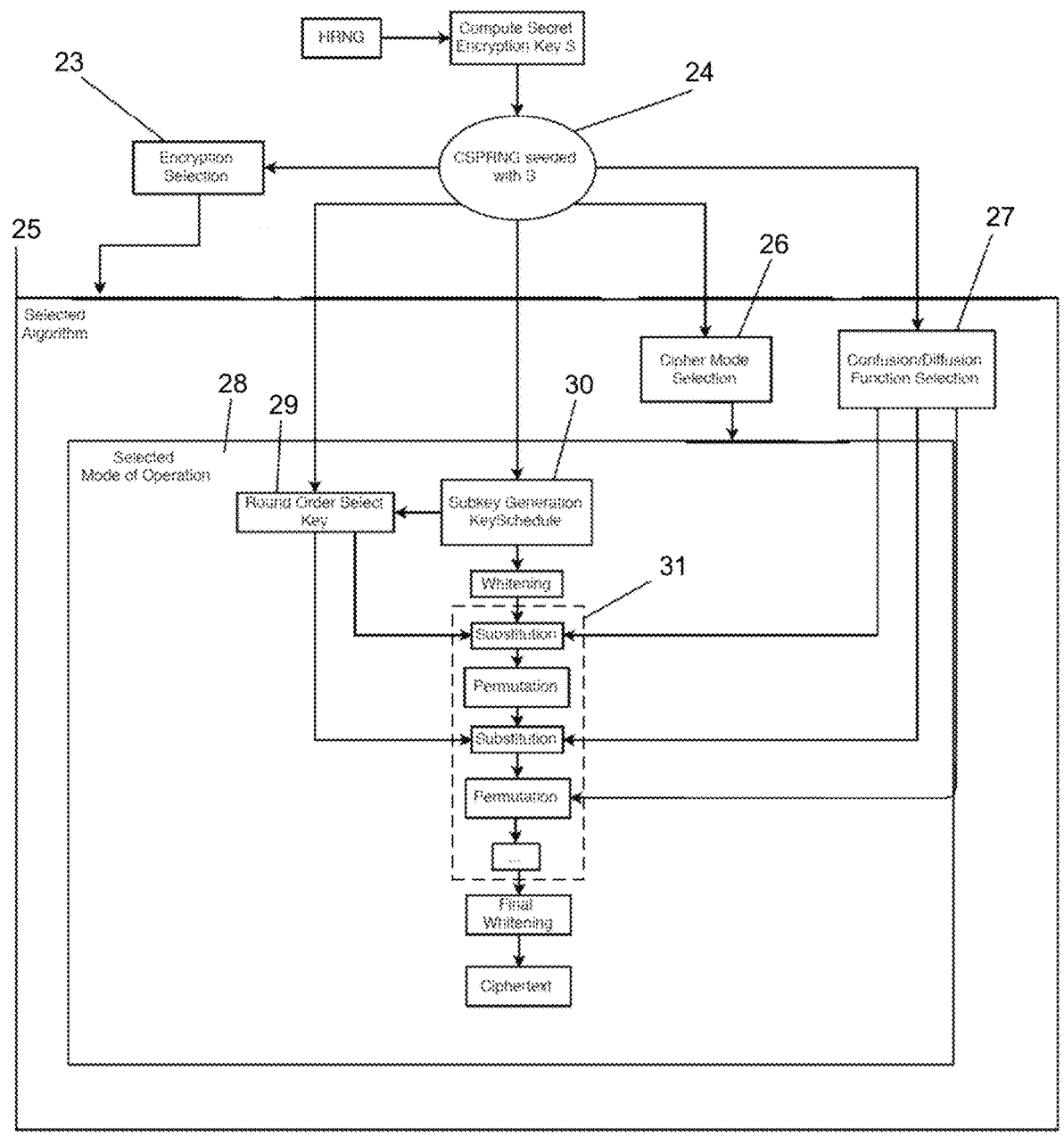
FIG. 3 is a flow chart for a method of selecting partial dynamic reconfigurable hardware via a cryptographically secure pseudo random number generator.

For the first and second general embodiments, the reconfigurable hardware logic module is shown in FIG. 3. This module implements a method for selecting reconfigurable hardware via a cryptographically secure pseudo random number generator. A cryptographically secure pseudo random number generator 24 can be seeded with the key S (see Equations (3) and (4) above) to produce a deterministic sequence for the reconfigurable logic controller. A selection 23 selects the encryption algorithm. A database 25 of encryption algorithms may be implemented in reconfigurable hardware. A database 26 of algorithm modes of operation may also be implemented in the reconfigurable hardware. A selection 27 selects which confusion or diffusion functions the block cipher executes. The selection 27 may be varied in the first general embodiment, but not in the second general embodiment. The selection 27 allows for both confusion and diffusion modules. A physical component (e.g., a mode selector) 28 selects an operation mode that may be implemented in the reconfigurable hardware. A method step 29 determines the order of rounds executed in each instance of the block cipher. A database 30 of key schedules may be implemented in the reconfigurable hardware. The database 30 may be used in the first general embodiment, but not in the second general embodiment. Modules 31 control the confusion and diffusion layers of the block cipher which provide nonlinear and linear characteristics for the algorithm.

Figure 4:
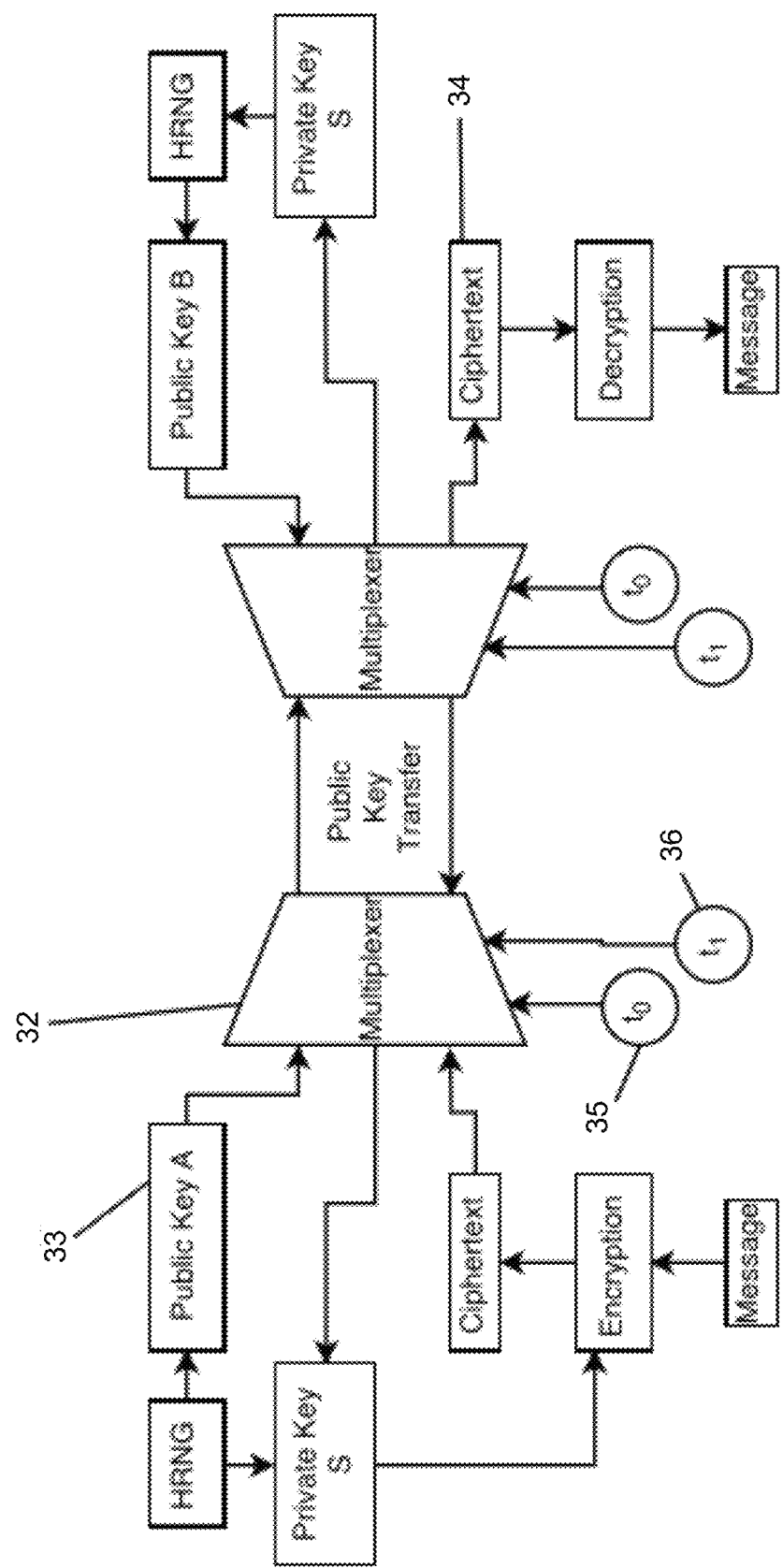
FIG. 4 is a diagram showing a method for sending a public key and cipher text through a wireless medium.

For the first, second and third general embodiments, a time division multiplexing scheme shown in FIG. 4 is used as an example. FIG. 4 shows an exemplary method of and exemplary hardware for multiplexing for the general embodiments, but the general embodiments are not limited to only this example. The method includes sending the public key and cipher text through the wireless medium. A multiplexer 32 selects one of several input signals and forwards them on a single line to another device. A public key 33 is sent (e.g., as one of the several input signals) over a wireless medium. A message 34 is encrypted. In a first time-division method step 35, at t=0, the public key is sent. In a second time-division method step 36, at t=1, the cipher text is sent.

Figure 5:
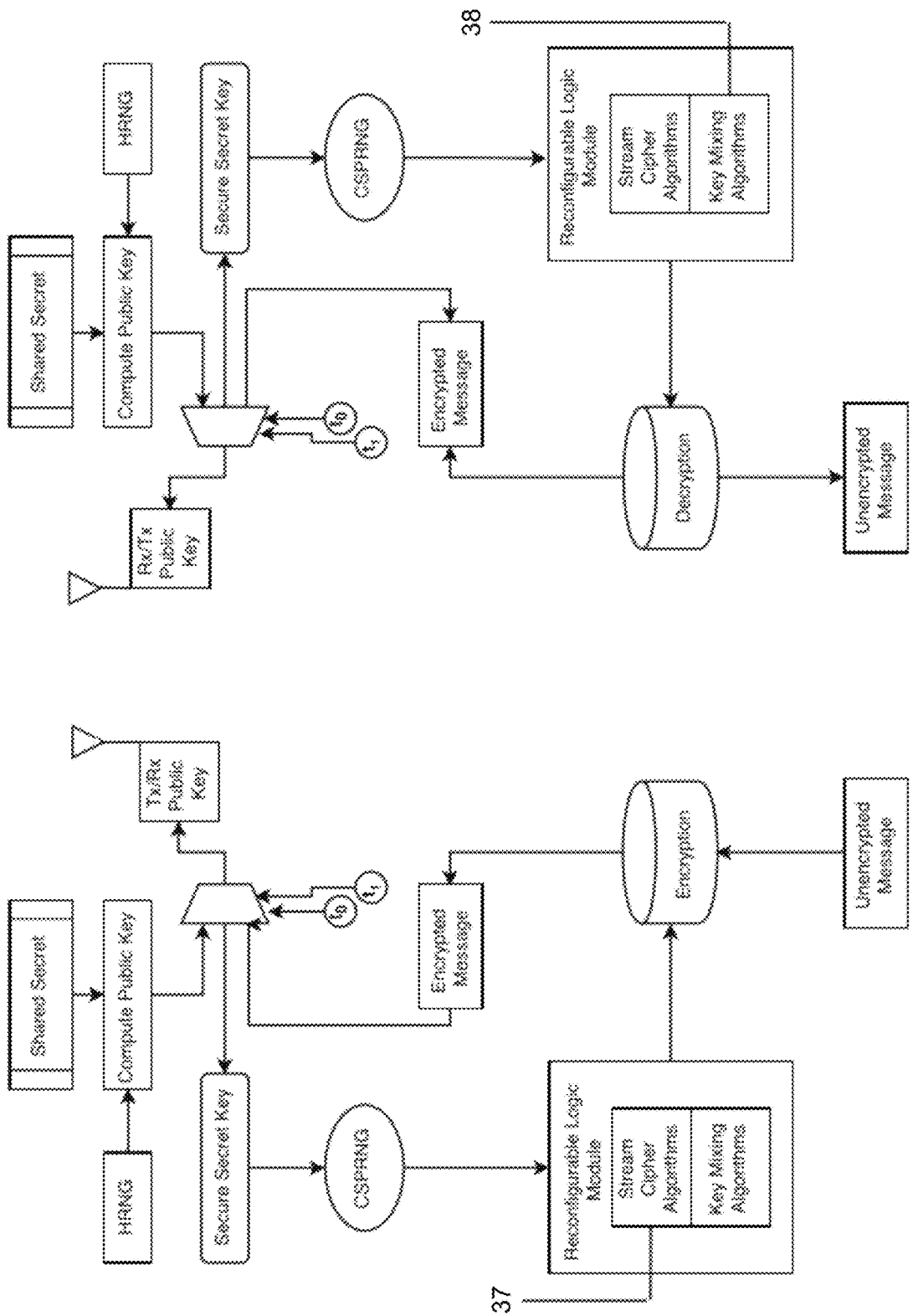
FIG. 5 is an overview of an encryption/decryption scheme for stream ciphers.

The third general embodiment includes or is based on the overview of the encryption/decryption scheme for stream ciphers in FIG. 5. The exemplary scheme of FIG. 5 is substantially identical to FIG. 1, (e.g., the first general embodiment), but with the exception(s) of certain changes made to module 7. A database 37 of stream cipher algorithms and a database 38 of key mixing algorithms may be implemented in reconfigurable hardware.

Figure 6:
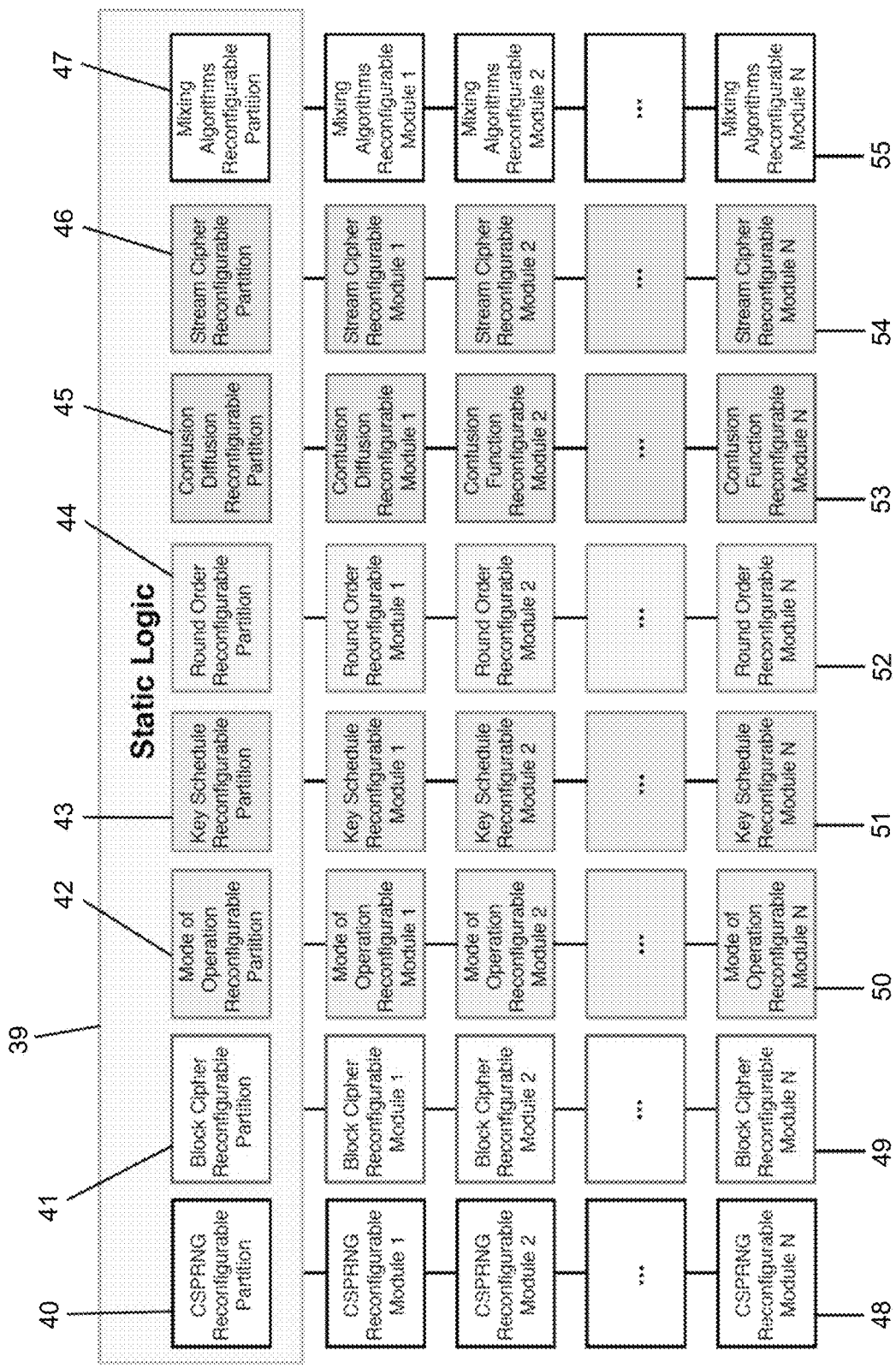
FIG. 6 is a diagram showing details of an exemplary Partial Dynamic Reconfigurable Hardware Encryption Module implemented in an FPGA.

For the first, second, and third general embodiments, the details of the Partial Dynamic Reconfigurable Hardware Encryption Module (PDRHEM) as shown in FIG. 6 are used as an example. This implements a method of encrypting using partial dynamic reconfigurable field programmable gate arrays (FPGAs), but the invention is not limited to only this example. Methods implemented by the PDRHEM in FIG. 6 include operations for reconfiguring static and dynamic hardware within the FPGA for performing encryption/decryption. A circuitry element 39 is not part of the reconfigurable partition, but is active when one or more of the reconfigurable partitions are active.

Reconfigurable partition 40 specifically reconfigures (e.g., allocates, designates, or selects one of a plurality of) the CSPRNG algorithms. Reconfigurable partition 41 specifically reconfigures (e.g., allocates, designates, or selects one of a plurality of) the block cipher algorithms. Reconfigurable partition 42 specifically reconfigures (e.g., allocates, designates, or selects one of a plurality of) the block cipher algorithm modes of operation. Reconfigurable partition 43 specifically reconfigures (e.g., allocates, designates, or selects one of a plurality of) the key scheduling algorithms. Reconfigurable partition 44 specifically reconfigures (e.g., allocates, designates, or selects one of a plurality of) the round order within a block cipher or block cipher algorithm. Reconfigurable partition 45 specifically reconfigures (e.g., allocates, designates, or selects one of a plurality of) the diffusion and/or confusion functions within a block cipher or block cipher algorithm. Reconfigurable partition 46 specifically reconfigures (e.g., allocates, designates, or selects one of a plurality of) the stream cipher algorithms. Reconfigurable partition 47 specifically reconfigures (e.g., allocates, designates, or selects one of a plurality of) the key mixing algorithms.

A storage element 48 contains a bitstream for the reconfigurable logic to implement CSPRNG algorithms 1 to N. A storage element 49 contains a bitstream for the reconfigurable logic to implement block cipher algorithms 1 to N. A storage element 50 contains a bitstream for the reconfigurable logic to implement block cipher modes of operation 1 to N. A storage element 51 contains a bitstream for the reconfigurable logic to implement key scheduling algorithms 1 to N. A storage element 52 contains a bitstream for the reconfigurable logic to implement random round order sequences 1 to N. A storage element 53 contains a bitstream for the reconfigurable logic to implement diffusion or confusion algorithms 1 to N. A storage element 54 contains a bitstream for the reconfigurable logic to implement stream cipher algorithms 1 to N. A storage element 55 contains a bitstream for the reconfigurable logic to implement mixing algorithms 1 to N.

Figure 7:
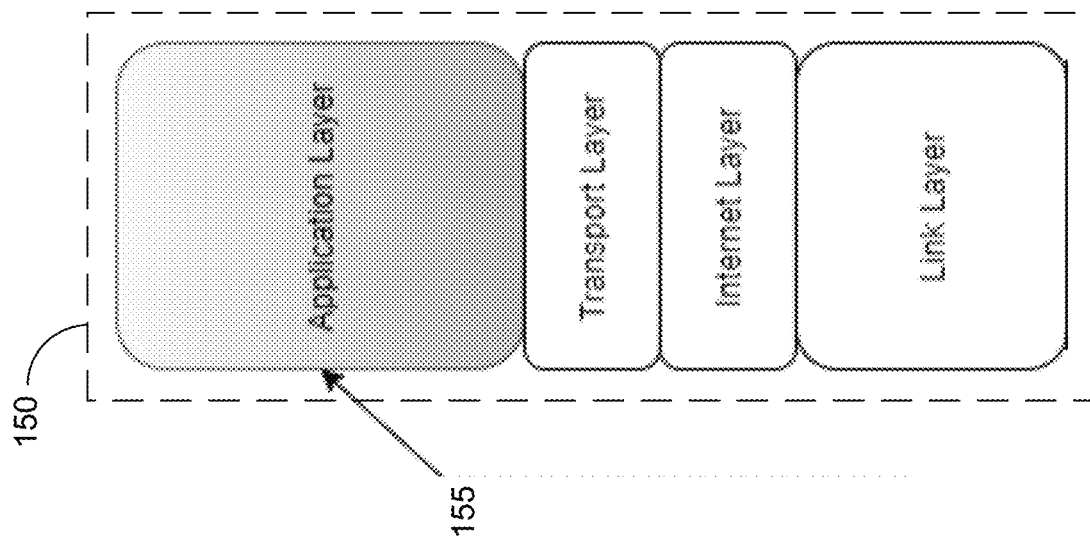
FIG. 7 is a diagram showing exemplary network models in which reconfigurable encryption and decryption can be implemented.
Figure 7:
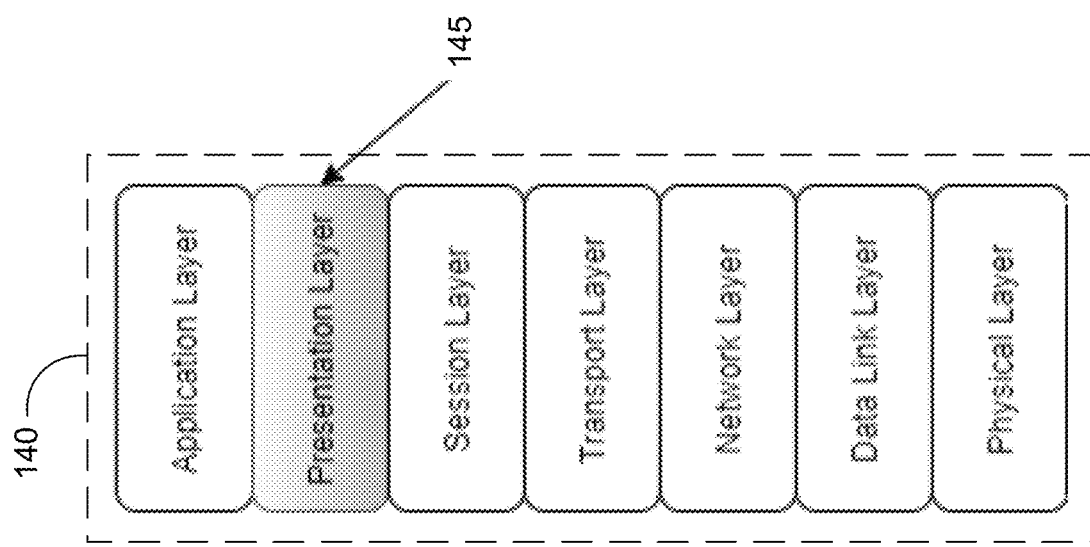

In one example, in the context of the Open Systems Interconnection (OSI) model of telecommunication systems, the CSPRNG may be executed in the Presentation Layer (e.g., the layer responsible for delivery and formatting of information to the application layer for further processing or display). In hardware implementations, the CSPRNG may be executed in the Physical Layer (e.g., the electronic circuits of IoT hardware devices). FIG. 7 shows examples of networks 140 and 150 in which reconfigurable encryption and decryption functions and/or blocks may be present. For example, reconfigurable encryption and decryption can be implemented in the Presentation Layer 145 of an Open Systems Interconnection (OSI) network model 140 and in the Application Layer 155 of a Transmission Control Protocol/Internet Protocol (TCP/IP) network model 150. The layers are conventional and known to those skilled in the art.

In the context of a Wi-Fi wireless communication protocol, the CSPRNG may be executed in the Data Link Layer (e.g., the protocol layer that transfers data between adjacent network nodes in a wide area network [WAN] or between nodes on the same local area network [LAN] segment). In hardware implementations, the CSPRNG may be executed in the Physical Layer.

In the context of a Bluetooth wireless communication protocol, encryption may be executed using the Link Manager Protocol (LMP), which is responsible for pairing, encryption, and signing in. In the context of a low-rate wireless personal area network (LR-WPAN) or Zigbee wireless communication protocol, the media access control (MAC) sublayer offers facilities that can be harnessed by upper layers to achieve the desired level of security. In hardware implementations, the CSPRNG may be executed in the Physical Layer.

Figure 8:
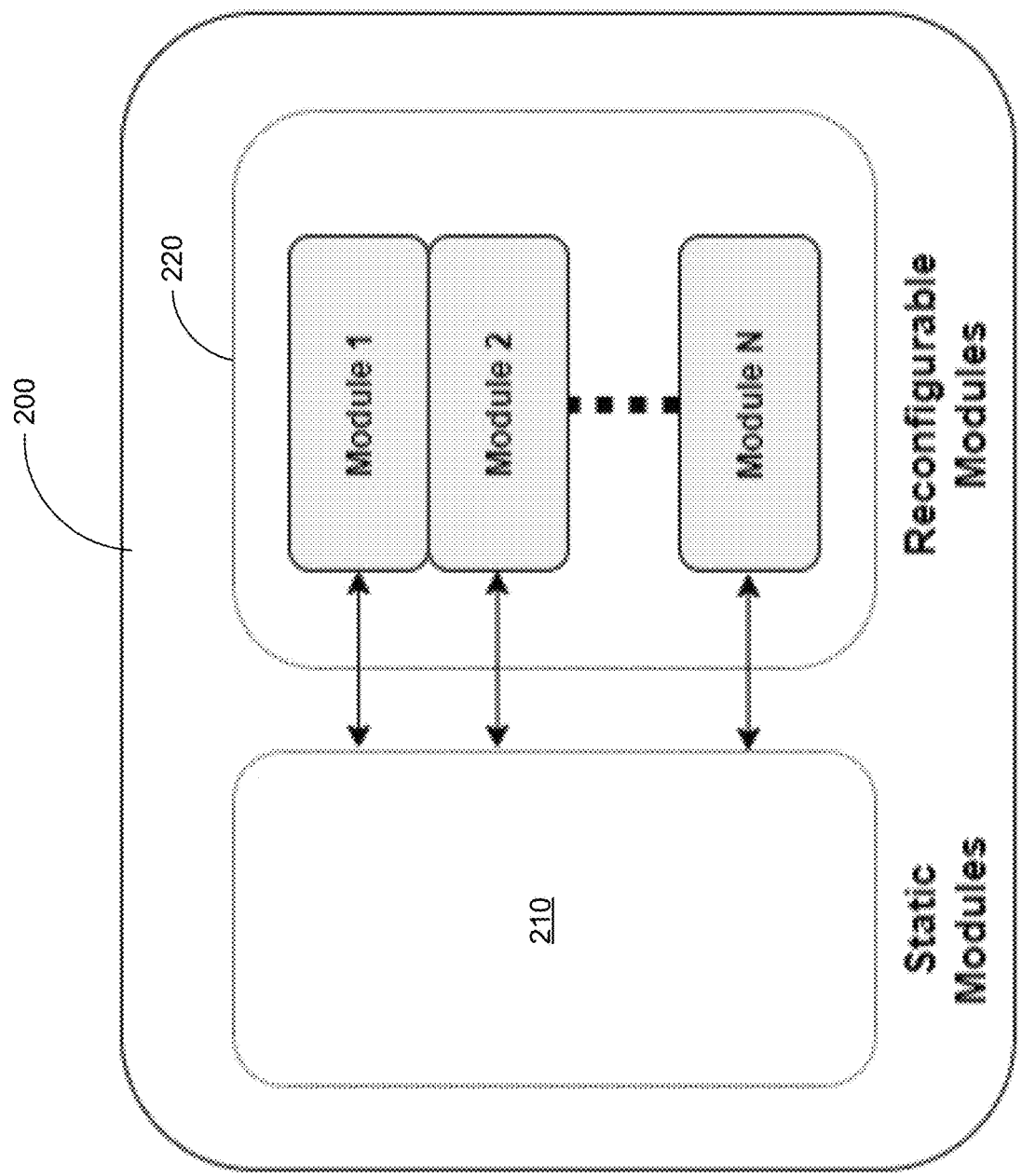
FIG. 8 shows an exemplary layout of an FPGA that can be customized for a specific application at the hardware level using programming software.

FIG. 8 shows a simple layout of a dynamically reconfigurable FPGA 200 that can be customized for a specific application at the hardware level using software. An FPGA (or complex programmable logic device [CPLD]) 200 is a chip that can be changed on the hardware level. Programming software can be used to program or change the way the FPGA operates, so that one can build a chip for whatever application one desires. Dynamic partial reconfiguration of the FPGA allows for generating full bit streams and partial bit streams. When used in conjunction with encryption algorithms, the blocks that make up the encryption algorithms can be changed on the fly.

The FPGA 200 implements partial dynamic reconfigurable hardware, which in the example shown in FIG. 8 includes one or more static modules 210 and a plurality of reconfigurable modules 220. The static module(s) 210 function as a central controlling agent and operate continuously in real time. The reconfigurable modules 220 are configured to implement and/or execute (i) one or more algorithms for the cryptographically secure pseudorandom number generator, (ii) the one or more block cipher encryption algorithms, (iii) modes of operation, (iv) one or more key scheduling algorithms, (v) round order within the one or more block cipher encryption algorithms, and/or (vi) one or more diffusion or confusion functions within the block cipher algorithms. The reconfigurable modules 220 perform receive data and/or instructions from and provide data to the static module(s) 210. In other or even further embodiments, the static module(s) 210 may be configured to reconfigure stream cipher encryption algorithms and/or one or more key mixing algorithms implemented and/or executed by the reconfigurable modules 220. The static module(s) 210 and/or reconfigurable modules 220 may be written to and/or read from a configuration memory in the FPGA 200 through an on-chip internal configuration access port (ICAP; not shown).

Figure 9:
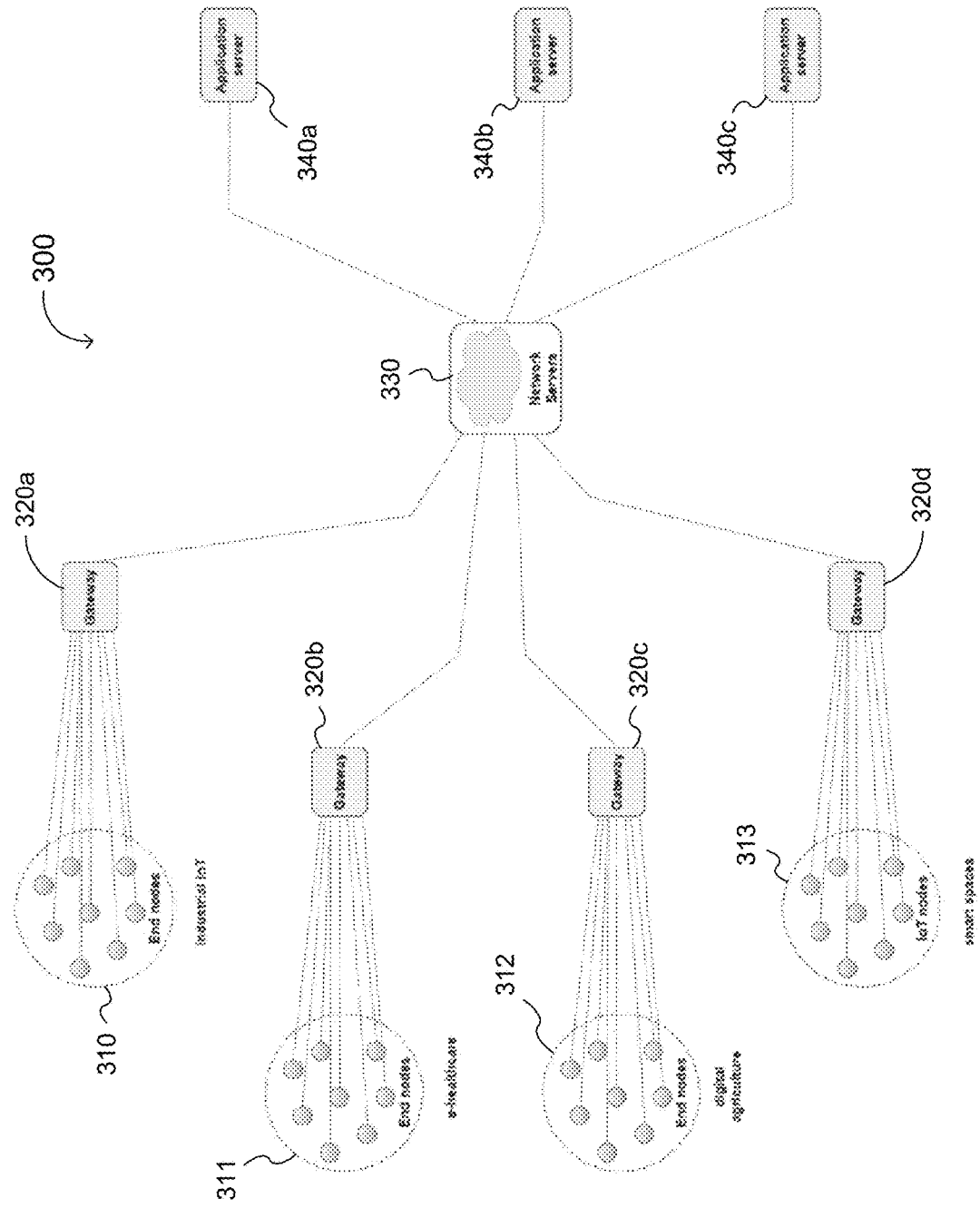
FIG. 9 is a diagram of an exemplary network including end nodes, a plurality of gateways or concentrators, a network server, and a plurality of application servers.

FIG. 9 is a diagram of an exemplary network 300 including a plurality of end nodes 310-313, a plurality of gateways or concentrators 320a-d, each operably communicating with one group of the end nodes 310-313, a network server 330, and a plurality of application servers 340a-c operably communicating with the network server 330, in parallel with each other. The end nodes 310-313 may comprise substantially any physical and/or electronic device, such as industrial and other Internet of Things (IoT) devices 310, electronic healthcare devices 311, digital signature devices 312, smart space devices 313, manufacturing and/or packaging equipment (not shown), shipping containers and/or vessels (not shown), etc. The reconfigurable hardware may be present at the end node(s) 310-313 and/or the gateway(s) or concentrator(s) 320a-c. Data is encrypted at the end nodes 310-313 (or at the gateways or concentrators 320a-d, if not at the corresponding end node) and passed through wireless and/or wired media as encrypted data.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover generic and specific features of the invention described herein and statements of the scope of the invention which, as a matter of language, might be said to fall therebetween.

CONCLUSION/SUMMARY

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system or apparatus for encrypting data that constitutes or implements hardware reconfigurable security algorithms, comprising:
    a hardware random number generator configured to produce a random value;
    a secure public key exchanger configured to receive the random value and define a first public key;
    a multiplexer configured to select one of the first public key and a first cipher text;
    a cryptographically secure pseudorandom number generator configured to implement a secure key transfer protocol;
    a hardware encryption module configured to generate and transmit the secure public key, the hardware encryption module comprising a digital circuit including reconfigurable logic and a database comprising a plurality of block cipher and/or stream cipher encryption algorithms, wherein the cryptographically secure pseudo random number generator further selects a configuration of the reconfigurable logic and provides an output that chooses the encryption algorithm from the database and varies at least one of the chosen encryption algorithm and a mode of operation of the encryption algorithm;
    a wireless transmitter configured to transmit the first public key and the first cipher text to another device; and
    a wireless receiver configured to receive a second public key and a second cipher text from the other device.

2. The system or apparatus of claim 1, wherein the hardware random number generator comprises a random number generator that converts a random process into random bits.

3. The system or apparatus of claim 2, wherein the random process comprises a noise signal, a thermal noise signal, or a random process utilizing a photoelectric effect, beam splitting, or other quantum phenomena.

4. The system or apparatus of claim 1, wherein the secure public key exchanger implements a secure public key transfer method comprising a Diffie-Hellman key exchange and/or a Rivest-Shamir-Adleman (RSA) key exchange.

5. The system or apparatus of claim 1, wherein the multiplexer comprises a space division multiplexer, a frequency division multiplexer, a time division multiplexer, a polarization division multiplexer, an orbital angular momentum multiplexer, and/or a code division multiplexer.

6. The system or apparatus of claim 1, wherein the cryptographically secure pseudorandom number generator comprises a random number generator that produces a deterministic random output.

7. The system or apparatus of claim 6, wherein the random number generator that produces a deterministic random output comprises a Yarrow algorithm, a ChaCha20 algorithm, a Fortuna algorithm, an ISAAC algorithm, and/or an Evolutionary algorithm.

8. The system or apparatus of claim 1, wherein the digital circuit comprises a field programmable gate array (FPGA), and/or an applied specific integrated circuit (ASIC).

9. The system or apparatus of claim 1, wherein the reconfigurable logic further includes one or more partitions configured to reconfigure (i) one or more algorithms for the cryptographically secure pseudorandom number generator, (ii) the plurality of block cipher encryption algorithms, (iii) modes of operation, (iv) one or more key scheduling algorithms, (v) round order within the plurality of block cipher encryption algorithms, and/or (vi) one or more diffusion or confusion functions within the block cipher algorithms.

10. The system or apparatus of claim 9, wherein the reconfigurable logic comprises a selection block configured to select one of a plurality of the confusion or diffusion functions, and the one or more partitions comprise a first partition configured to reconfigure the plurality of block cipher encryption algorithms, a second partition configured to reconfigure the mode of operation, a third partition configured to reconfigure the round order, a fourth partition configured to reconfigure the diffusion or confusion functions.

11. The system or apparatus of claim 1, wherein the reconfigurable logic further includes one or more partitions configured to reconfigure the stream cipher encryption algorithms and/or one or more key mixing algorithms.

12. The system or apparatus of claim 1, wherein the database comprises the plurality of block cipher encryption algorithms.

13. The system or apparatus of claim 12, wherein the block cipher encryption algorithms comprise one or more whitening keys, one or more key scheduling algorithms, and/or one or more confusion, diffusion, permutation, substitution and/or round iterations.

14. The system or apparatus of claim 1, wherein the database comprises the plurality of the one or more stream cipher encryption algorithms.

15. The system or apparatus of claim 14, wherein the stream cipher encryption algorithms comprise a pseudorandom key stream and/or one or more key mixing algorithms.

16. The system or apparatus of claim 1, wherein the wireless transmitter and the wireless receiver are each configured to operate in a wireless wide area network (WWAN), a wireless local area network (WLAN), a wireless personal area network (WPAN), a WiFi network, a Bluetooth network, and/or a Zigbee network.

17. The system or apparatus of claim 1, wherein the hardware encryption module further comprises (i) a second database comprising a plurality of modes of operation and (ii) a mode selector configured to select one of the modes of operation to be implemented in the reconfigurable logic.

18. The system or apparatus of claim 1, wherein the reconfigurable logic comprises a partial dynamic reconfigurable hardware encryption module configured to reconfigure one of a plurality of cryptographically secure pseudo random number generator algorithms, block cipher algorithms, block cipher algorithm modes of operation, key scheduling algorithms, round orders within a block cipher or block cipher algorithm, diffusion and/or confusion functions within the block cipher or block cipher algorithm, stream cipher algorithms and/or key mixing algorithms.

19. The system or apparatus of claim 18, wherein the partial dynamic reconfigurable hardware encryption module further comprises one or more storage elements that contain a first bitstream to implement the cryptographically secure pseudo random number generator algorithms, a second bitstream to implement the block cipher algorithms, a third bitstream to implement the block cipher modes of operation, a fourth bitstream to implement the key scheduling algorithms 1 to N, a fifth bitstream to implement random sequences for the round orders, a sixth bitstream to implement the diffusion or confusion algorithms, a seventh bitstream to implement the stream cipher algorithms, and/or an eighth bitstream to implement the key mixing algorithms.

20. The system or apparatus of claim 1, wherein when the database comprises the plurality of block cipher encryption algorithms, the reconfigurable logic (i) varies the modes of operation and further comprises (ii) a selection block configured to select one or more confusion or diffusion functions, and when the database comprises the plurality of stream ciphers, the reconfigurable logic varies the encryption algorithm and the key mixing algorithm.

* * * * *